US008165351B2

(12) United States Patent
Bendall

(10) Patent No.: US 8,165,351 B2
(45) Date of Patent: Apr. 24, 2012

(54) METHOD OF STRUCTURED LIGHT-BASED MEASUREMENT

(75) Inventor: Clark Alexander Bendall, Syracuse, NY (US)

(73) Assignee: General Electric Company, Schenectady, NY (US)

( * ) Notice: Subject to any disclaimer, the term of this patent is extended or adjusted under 35 U.S.C. 154(b) by 106 days.

(21) Appl. No.: 12/838,742

(22) Filed: Jul. 19, 2010

(65) Prior Publication Data
US 2012/0014563 A1 Jan. 19, 2012

(51) Int. Cl.
*G06K 9/00* (2006.01)

(52) U.S. Cl. .......... 382/106; 382/128; 382/154; 348/65; 348/68; 348/82; 348/85; 348/45; 600/101; 600/109; 600/160; 600/178

(58) Field of Classification Search .......................... None
See application file for complete search history.

(56) References Cited

U.S. PATENT DOCUMENTS

| 4,980,763 | A | * | 12/1990 | Lia | 348/67 |
| 5,633,675 | A | * | 5/1997 | Danna et al. | 348/65 |
| 5,822,066 | A | * | 10/1998 | Jeong et al. | 356/521 |
| 6,438,272 | B1 | * | 8/2002 | Huang et al. | 382/286 |
| 7,286,246 | B2 | * | 10/2007 | Yoshida | 356/605 |
| 2002/0163573 | A1 | * | 11/2002 | Bieman et al. | 348/46 |
| 2004/0189799 | A1 | * | 9/2004 | Spencer | 348/85 |
| 2006/0282009 | A1 | * | 12/2006 | Oberg et al. | 600/559 |
| 2007/0206204 | A1 | * | 9/2007 | Jia et al. | 356/604 |
| 2009/0225321 | A1 | | 9/2009 | Bendall et al. | |
| 2009/0225329 | A1 | | 9/2009 | Bendall et al. | |

* cited by examiner

*Primary Examiner* — Sath V Perungavoor
*Assistant Examiner* — Jason Heidemann
(74) *Attorney, Agent, or Firm* — GE Global Patent Operation; Mark A. Conklin

(57) ABSTRACT

A method of determining the distance to an object can use a video inspection device comprising a first light emitter and a second light emitter, wherein the first light emitter can emit light through an opening with at least one shadow-forming element. The method can comprise capturing at least one first emitter image with the first light emitter activated and the second light emitter deactivated, capturing at least one second emitter image with the second light emitter activated and the first light emitter deactivated, determining a first plurality of luminance values of the pixels in the at least one first emitter image, determining a second plurality of luminance values of the pixels in the at least one second emitter image, determining the brightness ratios of the second plurality of luminance values to the first plurality of luminance values, and determining an object distance using the brightness ratios.

20 Claims, 11 Drawing Sheets

METHOD OF STRUCTURED LIGHT-BASED MEASUREMENT

BACKGROUND OF THE INVENTION

The subject matter disclosed herein relates to structured-light based measurement, and more particularly to a structured light based method for determining the distance from a probe of a video inspection device to an object ("object distance").

Video inspection devices are used in a wide range of applications. In some applications, such as optical examinations of organs inside living bodies using an endoscope, or examinations of defects in commercial equipment, it is useful for the user of the video inspection device to be able to determine the probe's distance from the object examined in order to perform measurements on that object. To accomplish this and other viewing tasks, current probes employ a variety of methods. Some examples of measurement methods include stereo, shadow, and projected dot grid methods.

Stereoscopic systems generally use a special optic system to view the same scene from two vantage points, relying on a surface detail of the object in the images to match the two images. Object distance is determined by analyzing the slight differences in the images. Projected dot grid methods use a light source, such as a laser, to project dots onto the object. Spacing between the dots is then determined or the positions of the dots in the image are then determined in order to determine the object distance. Shadow methods place a single opaque element, such as a line, between a light source and an object. The element is positioned in the light emitted by the light source, offset at an angle from the centerline of the light and the light source. If the object is in the portion of the light field that contains the shadow cast by the opaque element, then as the object moves closer or farther from the apparatus, the position of the shadow in the image shifts and can thus be used to determine object distance.

Current measurement methods each have a variety of limitations. For instance, stereoscopic systems have a baseline spacing that is limited by the physical dimensions of the apparatus, including its bifocal viewing optics. The baseline spacing determines the resolution of the probe. Increasing the baseline spacing can provide better accuracy at a given object distance. Furthermore, in stereoscopic systems, the same point on the viewed object must be identified in both images in order to compute object distance. Many surfaces lack uniquely identifiable features, which makes the accurate determination of object distance difficult or impossible.

With shadow measurement methods, if the object is not in a portion of the field of view containing the shadow, no measurement can be taken. Furthermore, only one specific area is measured rather than a large field of view, so surface irregularity over the field of view and orientation of the object in the field of view are undetected.

In many stereoscopic measurement systems and shadow measurement systems, two sets of optics are used. A first set of optics is used to view an object, while a second set of optics is used to take measurements. The second set of optics, often contained in a separate probe tip, must be interchanged with the first set when a measurement is desired. For instance, in one shadow measurement system, the same general viewing light source is used for general viewing and for measurement. However, a separate shadow measurement tip must be installed to perform measurements with the general viewing light source when a defect or other measurable feature is discovered. This interchanging of probe tips consumes additional time and detracts from the efficient use of the probe.

Furthermore, shadow measurement optics significantly block light output, so that while the shadow measurement optics are used, the field of view is less well illuminated, which limits the viewing distance. Stereoscopic optics are also undesirable for general viewing as the image resolution and viewing depth of field are general reduced relative to those of normal viewing optics.

In other instances, a human subjective component (e.g., estimating where a shadow or other pattern falls in an image provided by a display, etc.) is involved that limits accuracy and prevents automatic measurements. Also, many probes or probe head assemblies are large or bulky, often because of the complexity of the design and/or arrangement of the viewing optics. Smaller and/or simpler viewing optics enable smaller probes and/or probe tips, with greater ability to be manipulated in tight spaces, or greater room to design and/or incorporate additional functionality.

It would be advantageous to determine the distance to the surface of an object during inspection without the disadvantages of the above systems.

BRIEF DESCRIPTION OF THE INVENTION

A method of determining the distance to the surface of an object is provided that avoids the disadvantages of the above systems.

In one embodiment, a method of structured light-based measurement for determining the distance from a probe of a video inspection device to an object is disclosed. The video inspection device can comprise a first light emitter and a second light emitter for emitting light through an opening with at least one shadow-forming element onto the object forming a plurality of shadows on the object when the light emitters are activated. The method can comprise capturing at least one first emitter image of the object with the first light emitter activated and the second light emitter deactivated, capturing at least one second emitter image of the object with the second light emitter activated and the first light emitter deactivated, determining a first plurality of luminance values of the pixels in the at least one first emitter image, determining a second plurality of luminance values of the pixels in the at least one second emitter image, determining the brightness ratios of the first plurality of luminance values of the pixels in the at least one first emitter image to the second plurality of luminance values of the pixels in the at least one second emitter image, and determining an object distance using the brightness ratios.

In one embodiment, a method of structured light-based measurement for determining the distance from a probe of a video inspection device to an object is disclosed. The video inspection device can comprise a first light emitter and a second light emitter, wherein the first light emitter can emit light through an opening with at least one shadow-forming element onto the object forming at least one shadow on the object when the first light emitter is activated. The method can comprise the steps of capturing at least one first emitter image of the object with the first light emitter activated and the second light emitter deactivated, capturing at least one second emitter image of the object with the second light emitter activated and the first light emitter deactivated, determining a first plurality of luminance values of the pixels in the at least one first emitter image, determining a second plurality of luminance values of the pixels in the at least one second emitter image, determining the brightness ratios of the second plurality of luminance values of the pixels in the at least one second emitter image to the first plurality of luminance values of the pixels in the at least one first emitter image, and determining an object distance using the brightness ratios.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. Thus, for further understanding of the invention, reference can be made to the following detailed description, read in connection with the drawings in which.

The drawings are not necessarily to scale, emphasis instead generally being placed upon illustrating the principles of the present invention. In the drawings, like numerals are used to indicate like parts throughout the various views.

DETAILED DESCRIPTION OF THE INVENTION

Figure 1:
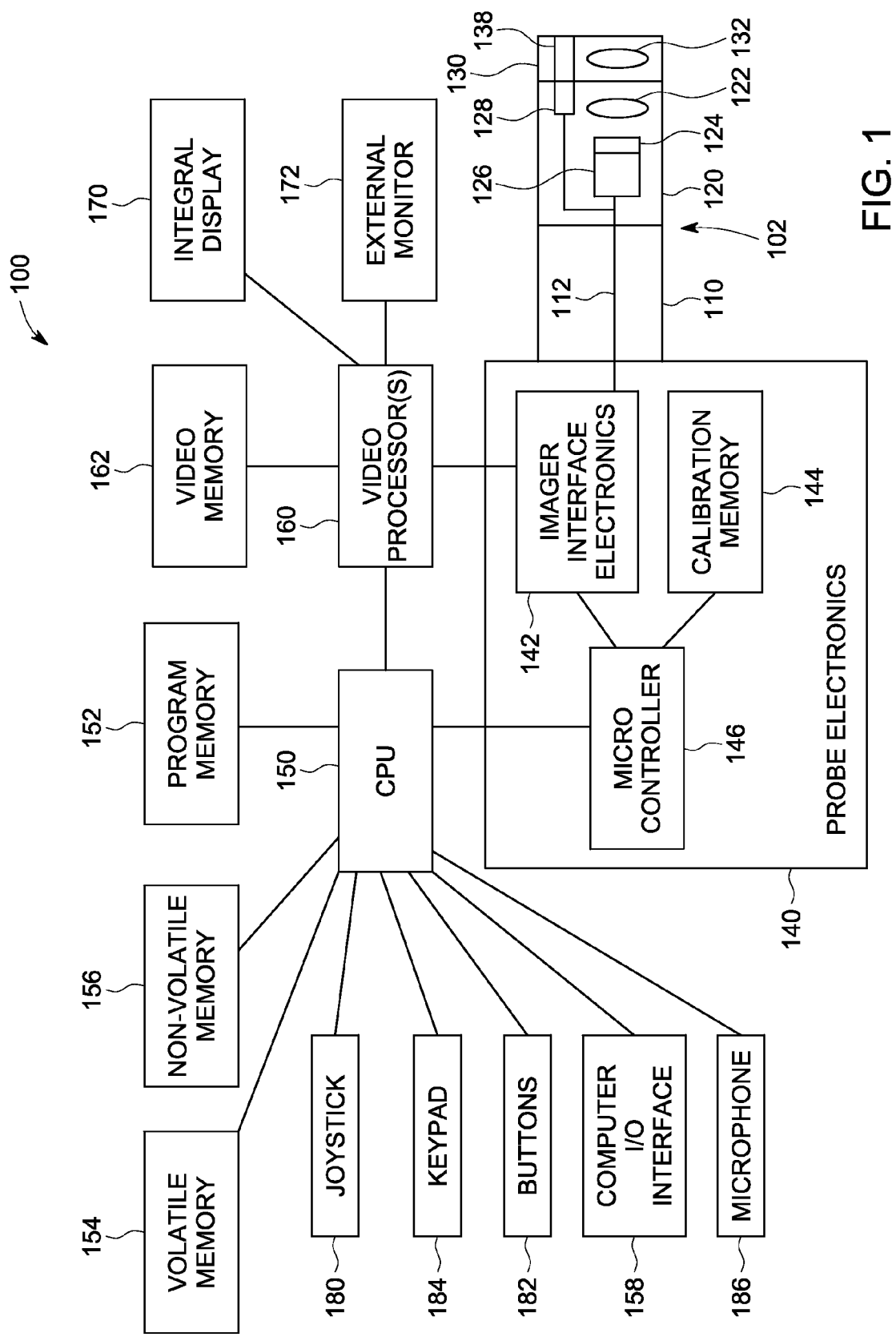
FIG. 1 is a block diagram of a video inspection device in one embodiment of the invention.

FIG. 1 is a block diagram of a video inspection device 100 in an exemplary embodiment of the invention. It will be understood that the video inspection device 100 shown in FIG. 1 is exemplary and that the scope of the invention is not limited to any particular video inspection device 100 or any particular configuration of components within a video inspection device 100.

Video inspection device 100 can include an elongated probe 102 comprising an insertion tube 110 and a head assembly 120 disposed at the distal end of the insertion tube 110. Insertion tube 110 can be a flexible, tubular section through which all interconnects between the head assembly 120 and probe electronics 140 are passed. Head assembly 120 can include probe optics 122 for guiding and focusing light from the object onto an imager 124. The probe optics 122 can comprise, e.g., a lens singlet or a lens having multiple components. The imager 124 can be a solid state CCD or CMOS image sensor for obtaining an image of the target object. The head assembly 120 can also include a general viewing light source 128 for illuminating the target object. The general viewing light source 128 can be provided in a number of different manners (e.g., a fiber optic bundle that transmits light from a proximally located lamp, LED or laser, or a distally located lamp or LED).

A detachable tip or adaptor 130 can be placed on the distal end of the head assembly 120. The detachable tip 130 can include tip viewing optics 132 (e.g., lenses, windows, or apertures) that work in conjunction with the probe optics 122 to guide and focus light from the target object onto an imager 124. The detachable tip 130 can also include illumination LEDs (not shown) if the source of light for the video inspection device 100 emanates from the tip 130 or a light passing element 138 for passing light from the probe 102 to the target object. The tip 130 can also provide the ability for side viewing by including a waveguide (e.g., a prism) to turn the camera view and light output to the side. The elements that can be included in the tip 130 can also be included in the probe 102 itself.

The imager 124 can include a plurality of pixels formed in a plurality of rows and columns and can generate image signals in the form of analog voltages representative of light incident on each pixel of the imager 124. The image signals can be propagated through imager hybrid 126, which provides electronics for signal buffering and conditioning, to an imager harness 112, which provides wires for control and video signals between the imager hybrid 126 and the imager interface electronics 142. The imager interface electronics 142 can include power supplies, a timing generator for generating imager clock signals, an analog front end for digitizing the imager video output signal, and a digital signal processor for processing the digitized imager video data into a more useful video format.

The imager interface electronics 142 are part of the probe electronics 140, which provide a collection of functions for operating the video inspection device 10. The probe electronics 140 can also include a calibration memory 144, which stores the calibration data for the probe 102 and/or tip 130. The microcontroller 146 can also be included in the probe electronics 140 for communicating with the imager interface electronics 142 to determine and set gain and exposure settings, storing and reading calibration data from the calibration memory 144, controlling the light delivered to the target object, and communicating with the CPU 150 of the video inspection device 10.

In addition to communicating with the microcontroller 146, the imager interface electronics 142 can also communicate with one or more video processors 160. The video processor 160 can receive a video signal from the imager interface electronics 142 and output signals to various monitors, including an integral display 170 or an external monitor 172. The integral display 170 can be an LCD screen built into the video inspection device 100 for displaying various images or data (e.g., the image of the target object, menus, cursors, measurement results) to an inspector. The external monitor 172 can be a video monitor or computer-type monitor connected to the video inspection device 100 for displaying various images or data.

The video processor 160 can provide/receive commands, status information, streaming video, still video images, and graphical overlays to/from the CPU 150 and may be comprised of FPGAs, DSPs, or other processing elements which provide functions such as image capture, image enhancement, graphical overlay merging, distortion correction, frame averaging, scaling, digital zooming, overlaying, merging, flipping, motion detection, and video format conversion and compression.

The CPU 150 can be used to manage the user interface by receiving input via a joystick 180, buttons 182, keypad 184, and/or microphone 186, in addition to providing a host of other functions, including image, video, and audio storage and recall functions, system control, and measurement processing. The joystick 180 can be manipulated by the user to perform such operations as menu selection, cursor movement, slider adjustment, and articulation control of the probe 102, and may include a push-button function. The buttons 182 and/or keypad 184 also can be used for menu selection and providing user commands to the CPU 150 (e.g., freezing or saving a still image). The microphone 186 can be used by the inspector to provide voice instructions to freeze or save a still image.

The video processor 160 can also communicate with video memory 162, which is used by the video processor 160 for frame buffering and temporary holding of data during processing. The CPU 150 can also communicate with CPU program memory 152 for storage of programs executed by the CPU 150. In addition, the CPU can be in communication with volatile memory 154 (e.g., RAM), and non-volatile memory 156 (e.g., flash memory device, a hard drive, a DVD, or an EPROM memory device). The non-volatile memory 156 is the primary storage for streaming video and still images.

The CPU 150 can also be in communication with a computer I/O interface 158, which provides various interfaces to peripheral devices and networks, such as USB, Firewire, Ethernet, audio I/O, and wireless transceivers. This computer I/O interface 158 can be used to save, recall, transmit, and/or receive still images, streaming video, or audio. For example, a USB "thumb drive" or CompactFlash memory card can be plugged into computer I/O interface 158. In addition, the video inspection device 100 can be configured to send frames of image data or streaming video data to an external computer or server. The video inspection device 100 can incorporate a TCP/IP communication protocol suite and can be incorporated in a wide area network including a plurality of local and remote computers, each of the computers also incorporating a TCP/IP communication protocol suite. With incorporation of TCP/IP protocol suite, the video inspection device 100 incorporates several transport layer protocols including TCP and UDP and several different layer protocols including HTTP and FTP.

Figure 2:
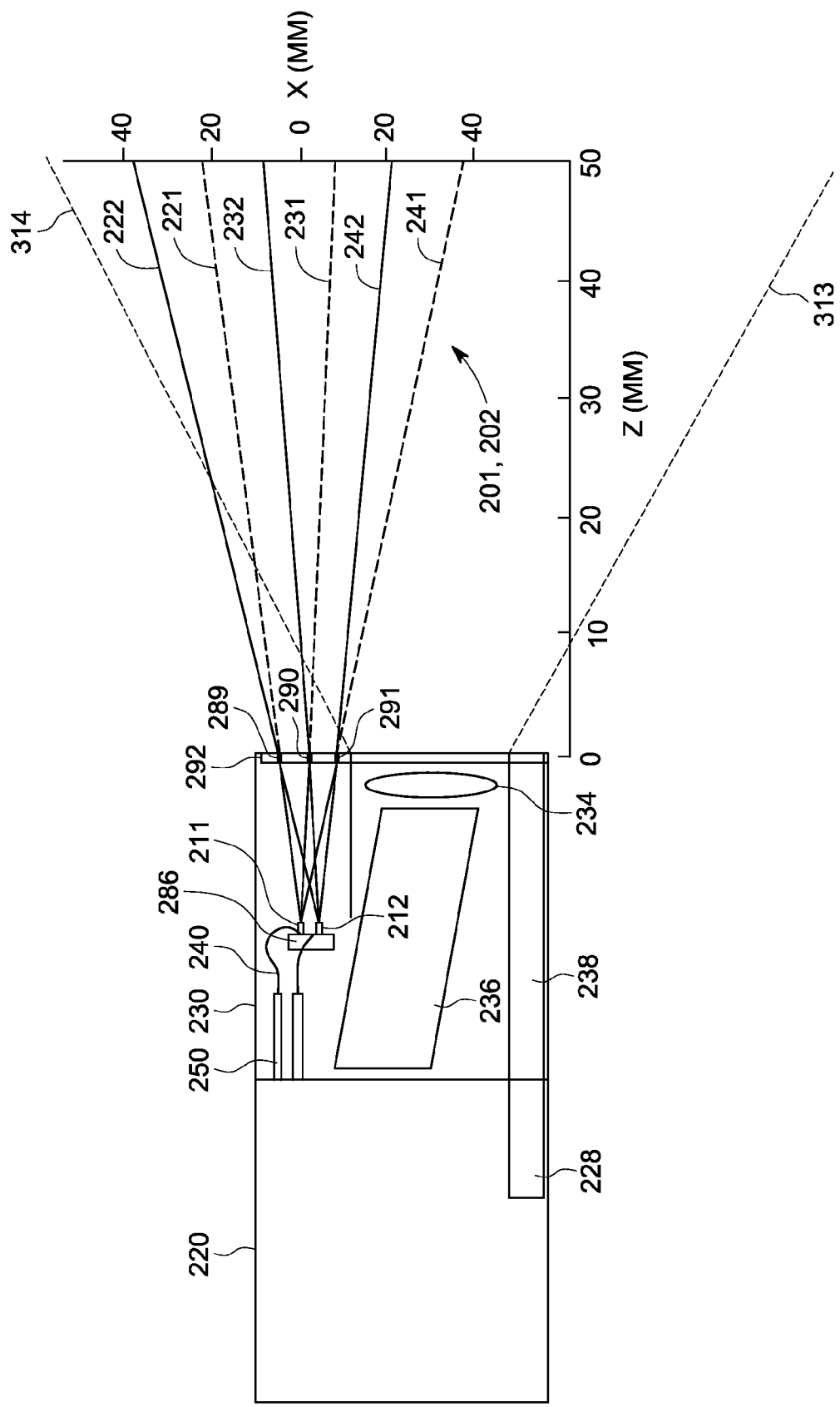
FIG. 2 is a schematic top view of the mechanical configuration of a probe head assembly and detachable tip projecting shadow patterns in one embodiment of the invention using two light emitters and three shadow-forming elements.

FIG. 2 is a schematic top view of a mechanical configuration of a probe head assembly 220 and a detachable tip 230 projecting shadow patterns in one embodiment of the invention using two light emitters 211, 212 and three shadow-forming elements 289, 290, 291. Referring to FIG. 2, the detachable tip 230 can be attached to the distal end of the probe head assembly 220. Housed inside the detachable tip 230 can be a set of tip viewing optics which can be further comprised of structured-light projecting optics and light receiving optics.

In one embodiment, the detachable tip 230 can be a separate component from the probe head assembly 220, attachable to and detachable from the probe head assembly 220. In another embodiment, as previously stated, the elements of the detachable tip 230 can be housed inside or otherwise integrated with the probe head assembly 220. Furthermore, elements described as housed in the probe head assembly 220 can be housed in the detachable tip 230. For ease of description, the embodiments described herein refer to the detachable tip 230 as being detachable, but embodiments in which the elements of the detachable tip 230 are integrated with the probe head assembly 220 are envisioned as well. Also for ease of description, the tip viewing optics and the structured-light projecting optics, or portions thereof, are described as being housed entirely in the detachable tip 230. These components, however, can be housed according to the various embodiments described above, including being split up between the detachable tip 230 and the probe head assembly 220. Also, while the description refers to the probe head assembly 230 of a video inspection device 100, another similar device can also be used.

The structured-light projecting optics can comprise two or more light emitters 211, 212 and one or more shadow-forming elements 289, 290, 291. The shadow-forming elements 289, 290, 291 and the light emitters 211, 212 can be integrated with the probe head assembly 220 or attached as part of the detachable tip 230 during general viewing, so that the shadow-forming elements 289, 290, 291 and the light emitters 211, 212 can be used without interchanging viewing tips to take measurements or to determine spatial relationships of a viewed object 206. The light emitters 211, 212 can be single light emitting diodes (LED's), optical fibers, lasers, or another light emitting source. The light emitters 211, 212 can be single or multiple, thin, long, or variously shaped as appropriate. Any small, high-intensity light emitter that produces a fairly uniform output can be used. One skilled in the art would recognize appropriate alternatives. Using small light emitters 211, 212, and fewer light emitters 211, 212, can conserve physical space, allowing the size of the detachable tip 230 to be small, or allowing more room for further complexity of the detachable tip 230.

The light emitters 211, 212 can be positioned firmly in place with respect to one another and/or with respect to the detachable tip 230. A single die 286 may include light emitters 211,212, thus inherently controlling the relative position of light emitters 211, 212. The light emitters 211, 212 can emit light through an opening 292 in the distal end of the detachable tip 230. The opening 292 can be an open window or a window partially or fully closed by glass, plastic, or another light transmitting material. The light emitters 211, 212 can act as a light source during general viewing, or an alternate general viewing light source 228, possibly in conjunction with a light passing element 238, can provide full light output during general viewing.

In the light emitted by the light emitters 211, 212 through the opening 292, one or more shadow-forming elements 289, 290, 291 can be positioned. These shadow-forming elements 289, 290, 291 can be positioned in or near the opening 292. When a light transmitting material is used to enclose the opening 292, the shadow-forming elements 289, 290, 291 can be positioned on, attached to, or integrated with the light transmitting material. The shadow-forming elements 289, 290, 291 can be solid objects, or the shadow-forming elements can be a painted onto a transparent window. A liquid crystal display (LCD) can also be used to create shadow-forming elements 289, 290, 291. With an LCD, an operator can have greater control to manipulate the shadow-forming elements, changing the size, shape, darkness, position, and existence.

In the exemplary embodiment illustrated by FIG. 2, three shadow-forming elements 289, 290, 291 can be configured to project shadows shaped like lines, bars, or rectangles that increase in darkness from the long edges toward the center. However, any number of shadow-forming elements 289, 290, 291 greater than or equal to one can be used. As FIG. 1 is a two-dimensional top view, the depth (i.e. the elongated dimension) of the shadow-forming elements 289, 290, 291 is not seen. In one embodiment, the shadow-forming elements 289, 290, 291 can be thinner than the width of the light emitters 211, 212. It may be possible to retain the necessary shape of the projected shadows using shadow-forming elements 289, 290, 291 with widths up to twice the width of the light emitters 211, 212. In the exemplary embodiment illustrated, the shadow-forming elements 289, 290, 291, have a width approximately equal to the width of the light emitters 211, 212. The shadow-forming elements 289, 290, 291 can alternatively be shaped or sized variously to produce shadows of the desired width, length, or shape.

The shadow-forming elements 289, 290, 291 can obstruct a portion of the light emitted from the light emitters 211, 212, so that projected shadow patterns 201, 202, which are patterns of light and shadow, can be projected forward from the probe head assembly 220 and/or the detachable tip 230. The light emitters 211, 212 can be activated one at a time. Shadow pattern 201 can be projected during activation of the first light emitter 211, and shadow pattern 202 can be projected during activation of the second light emitter 212. When the light emitters 211, 212 are activated, the general viewing light source 228 can be deactivated. The light emitters 211, 212 and the shadow-forming elements 289, 290, 291 can be positioned and configured so that if the light emitters 211, 212 emit light simultaneously, then the projected shadow patterns 201, 202 have alternating areas of light and shadow. In other words, if the shadow patterns 201, 202 are superimposed, then the shadows in the superimposed shadow patterns 201, 202 may not overlap. The projected shadows can have abrupt edges or the projected shadows can transition smoothly to light. However, approaching the center of the shadow in the X direction from an abrupt edge or smooth transition, the brightness values of the shadow decrease.

Using narrow beam light emitters 211, 212 promotes relatively narrow shadows. Using narrow shadow-forming elements 289, 290, 291 approximately the same width as, or within a range of the width of the light emitters 211, 212, also helps promote relatively narrow shadows that do not overlap. When the shadow-forming elements 289, 290, 291 are too wide, the projected shadows can also be large and the projected shadows from one light emitter 211, 212 can overlap with the projected shadows from another light emitter 211, 212. If the shadow-forming elements 289, 290, 291 are too thin as compared to the light emitters 211, 212, then light can be angled past the shadow-forming elements 289, 290, 291 to or toward the center of the projected shadow so that the projected shadow is weak or is not clearly defined. Maximizing the shadow-forming elements 289, 290, 291 to a width as great as the width of the light emitters 211, 212 promotes relatively distinct and narrow shadows that do not overlap.

The light emitters can be powered by conventional methods. For instance, as illustrated in FIG. 2, the light emitters 211, 212 can receive electrical signals, including electrical power through a first set of wires 240, which are connected to the light emitters 211, 212. The first set of wires 240 can terminate at a first set of electrical contacts 250, which can further connect to or disconnect from a second set of electrical contacts (not shown) housed in the probe head assembly 220. This arrangement enables the detachable tip 230 to be attachable to and detachable from the probe head assembly 220. The second set of electrical contacts (not shown) can connect to a second set of electrical wires (not shown) that extend through the head of the probe head assembly 220. The wires lead upstream to a drive circuit (not shown) and/or power source (not shown, see FIG. 1). Other wiring arrangements would be recognized by one of ordinary skill in the art.

For instance, in one alternative embodiment, a bidirectional drive circuit (not shown) can be used with nonparallel light emitters 211, 212, a single wire 240, and if necessary, a single contact 250 to drive the light emitters 211, 212. In this embodiment, the probe head assembly 220 can be used for electrical grounding.

The light-receiving optics receive light projected from the structured-light projecting optics and reflected from the object 206 within the field of view. When the object 206 is in front of the probe head assembly 220, the projected shadow patterns 201, 202 project onto the object 206. The light reflects off the object 206 back at the probe head assembly 220 where light-receiving optics pass the light to the probe optics 122 and the imager 124. In the exemplary embodiment illustrated by FIG. 2, the light-receiving optics comprise a lens 234 and a prism 236. The lens 234 can be positioned above, below, or to the side of the light emitters 211, 212 and shadow forming elements 289, 290, 291. The lens 234 can focus the image through the prism 236 to the probe optics 122 and the imager 124. In the exemplary embodiment, the distance the lens 234 is offset to the side of the light emitters 211, 212 and/or the shadow-forming elements 289, 290, 291 can determine the baseline spacing. Using a limited number of light emitters 211, 212 and shadow-forming elements 289, 290, 291 and/or using small light emitters 211, 212 and small shadow-forming elements 289, 290, 291 can leave additional space to further offset the lens 234, which increases the baseline spacing, and therefore, the accuracy and/or resolution of the video inspection device 100.

The prism 236 may be shaped appropriately to direct light in the appropriate direction. In FIG. 2, the prism 236 is trapezoidal. Further, as one skilled in the art would know, the arrangement of the tip viewing optics in the device can vary, in part depending on the particular video inspection device 100 to which the detachable tip 230 can be designed to attach and detach, or with which the elements of the detachable tip 230 can be integrated. For example, in one alternative embodiment, the light emitters 211, 212 and/or shadow-forming elements 289, 290, 291 can reside on both sides of the light-receiving optics, potentially allowing the use of more light emitters 211, 212 and/or more shadow-forming elements 289, 290, 291, and/or potentially providing better data density. In another embodiment, the lens 234 and the prism 236 are absent, utilizing only the probe optics 122 pre-existing in a pre-existing video inspection device 100.

The projected shadow patterns 201, 202 have shadow projection trajectories shown out to an object distance of 50 millimeters (1.9685 inches) from the detachable tip 230 along the Z axis, where the shadows are projected onto the flat, matte, white surface. The two-dimensional spacing of the figure represents the field of view as seen from above looking down. Shadow trajectories are represented by lines 221, 222, 231, 232, 241, and 242. Lines 313, 314 represent the edges of the field of view. Lines 221, 231, and 241 represent the shadows projected by the three shadow forming elements 289, 290, and 291 while the first light emitter 211 is activated. Lines 222, 232, and 242 represent the centers of the shadows projected into the field of view by the same three shadow forming elements 289, 290, and 291 while light emitter 212 is activated. The center shadow forming element 290 is located at approximately the origin (0, 0). The light emitters 211, 212 are located in the negative distance direction from the origin, along the Z axis. The origin can alternatively be considered at another location, such as at the position of one of the light emitters 211 or 212, or at a center point between the light emitters 211, 212.

As seen in FIG. 2, the positions of the shadows vary with the distance from the detachable tip 230, and the variation can be predictable. Therefore, determining where the shadows fall on the object 206 in the field of view can enable determination of the distance and magnification of the object 206 at the measured location. Knowing the geometry of the elements, such as the tip viewing optics in the detachable tip 230, the distance of the object 206 can be determined by triangulation quickly and automatically by the video inspection device 100, without human subjectivity. In this manner, the video inspection device 100 can provide automatic object distance values and other spatial characteristics. However, the shadows are not necessarily or always clearly defined or identifiable in the images captured during illumination with one of the light emitters 211, 212. For instance, it can be difficult to locate the edges or centers of the shadows with high accuracy due to surface irregularities causing reflected light or creating additional shadows. However, the shadow positions, or points in the shadow on the object 206 in the field of view can be more precisely located.

Figure 3:
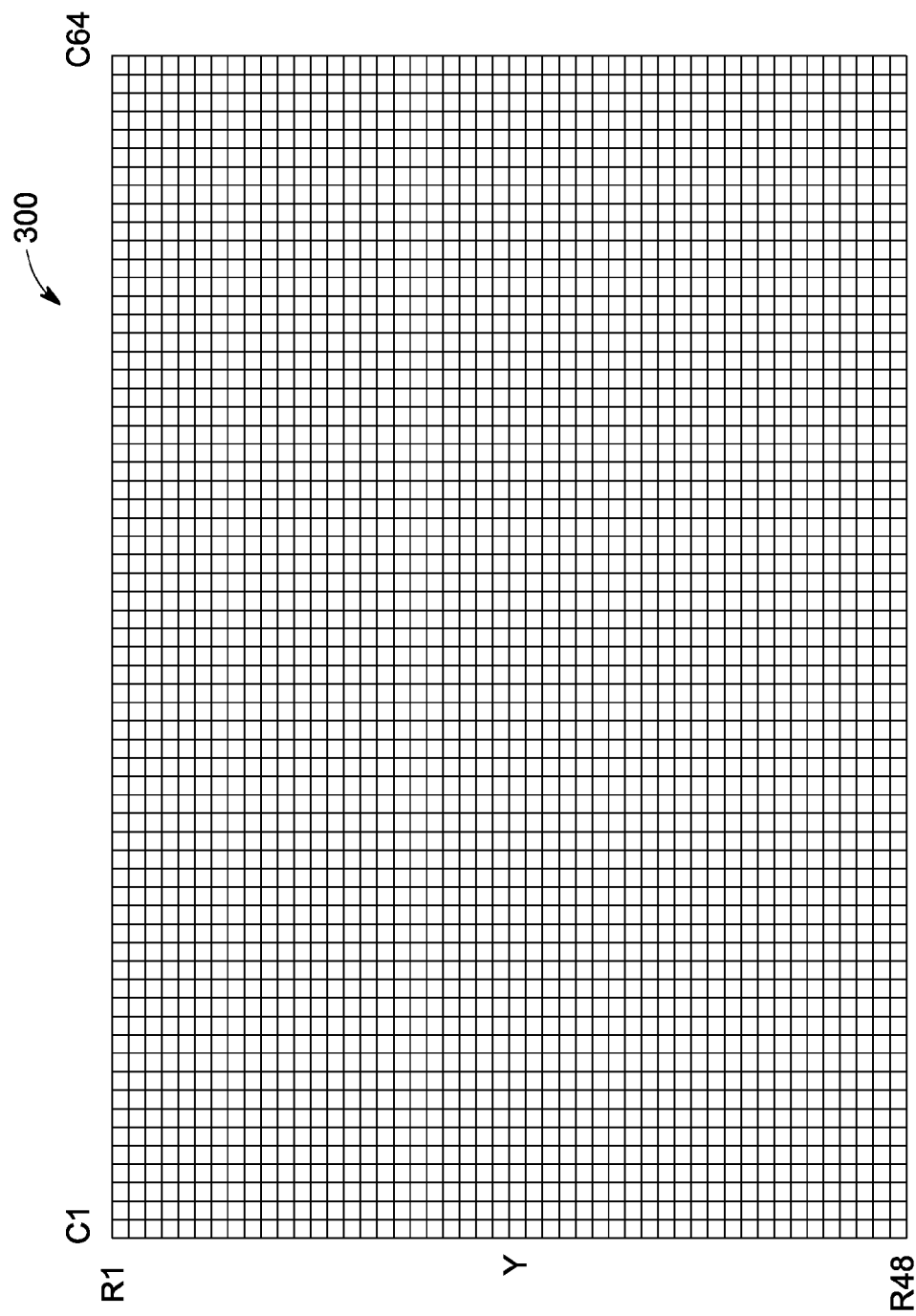
FIG. 3 illustrates a pixilated image of a flat, white object positioned 50 mm from the detachable tip of FIG. 2, the image being captured during general viewing with the detachable tip of FIG. 2 and the video inspection device of FIG. 1 in one embodiment of the invention.

To initiate an image capturing sequence enabling the determination of spatial characteristics of the viewed object 206, including object distance, a general viewing image 300 can be captured with the general viewing light source 228 activated and the light emitters 211, 212 deactivated. FIG. 3 illustrates one row of a pixilated general viewing image 300 of the flat, white object 206 positioned 50 mm from the detachable tip of FIG. 2, the general viewing image 300 being captured during general viewing with the detachable tip of FIG. 2 and the video inspection device 100 of FIG. 1 in one embodiment of the invention. For illustration purposes only, the pixilated general viewing image 300 contains 48 rows and 64 columns of pixels. The rows and columns can be much larger, such as but not limited to 640 by 480 or 1280 by 1024. The general viewing image 300 can be captured using the general viewing light source 228 with no shadows being projected. However, one or more of the light emitters 211, 212 can alternatively be used during general viewing. More than one general viewing image 300 can be captured, and values obtained can be averaged. Each pixel can have an associated luminance (or brightness) value (e.g., grey scale value between 0 and 255).

Figure 4:
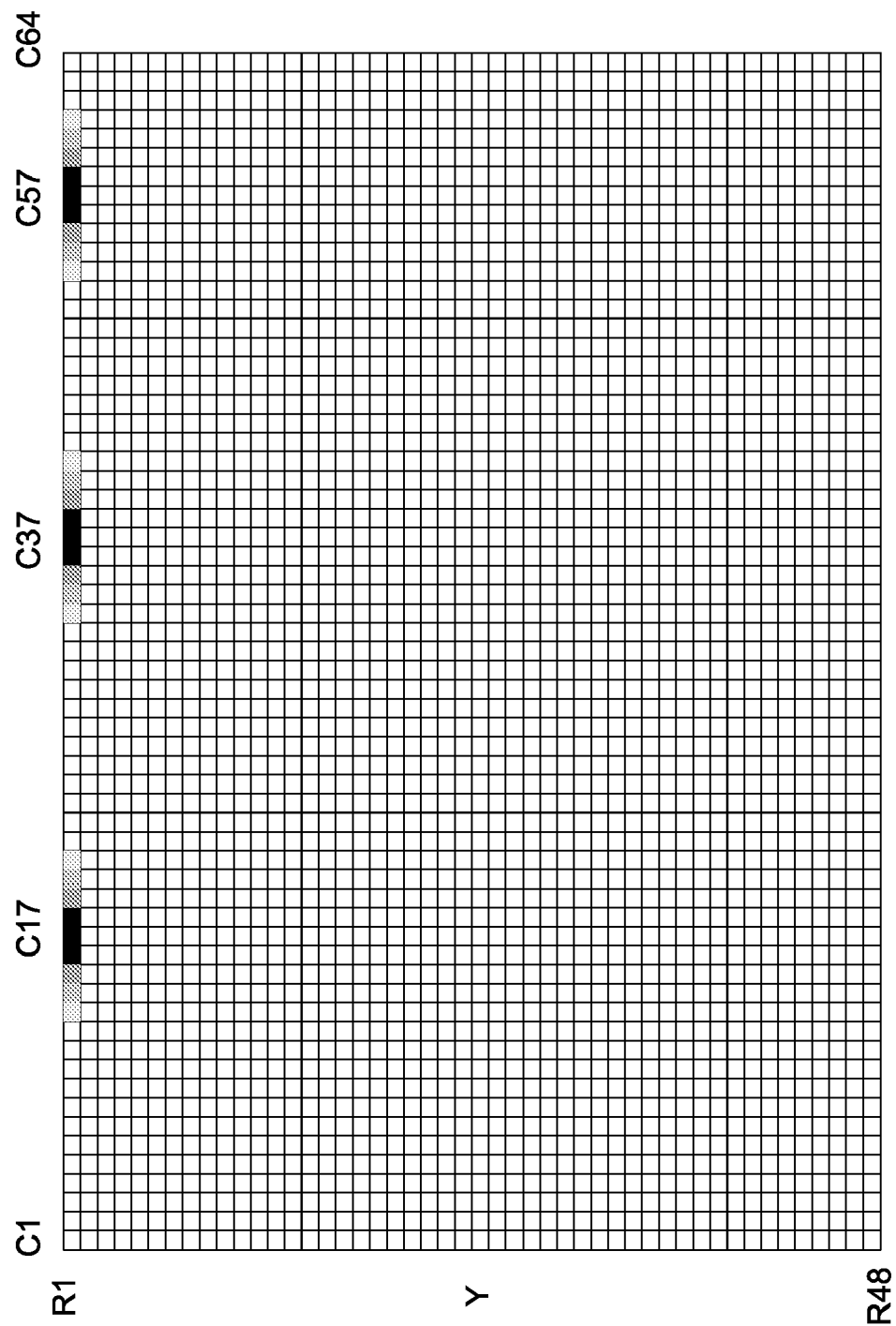
FIG. 4 illustrates one row of a pixilated image of a flat, white object positioned 50 mm from the detachable tip of FIG. 2, the image being captured during activation of a first light emitter, in one embodiment of the invention.

To continue the image capturing sequence, a first emitter image 400 can be captured with the general viewing light source 228 deactivated, the second light emitter 212 deactivated, and the first light emitter 211 activated. FIG. 4 illustrates one row of the pixilated first emitter image 400 of the flat, white object 206 positioned 50 mm from the detachable tip 230 of FIG. 2, the first emitter image 400 being captured during activation of the first light emitter 211 and deactivation of the general viewing light source 228 and the second light emitter 212, using the detachable tip 230 of FIG. 2. Multiple first emitter images 400 can also be captured, and the values obtained from each first emitter image 400 can be averaged. Each pixel can have an associated luminance value (e.g., grey scale between 0 and 255). The center of each shadow in the projected shadow pattern 201 is captured in the image pixels C17, C37, and C57 of row R1. Each shadow tapers moving outward from each shadow's center, so the brightness value in each pixel increases moving to the left or to the right from the center of each shadow.

Figure 5:
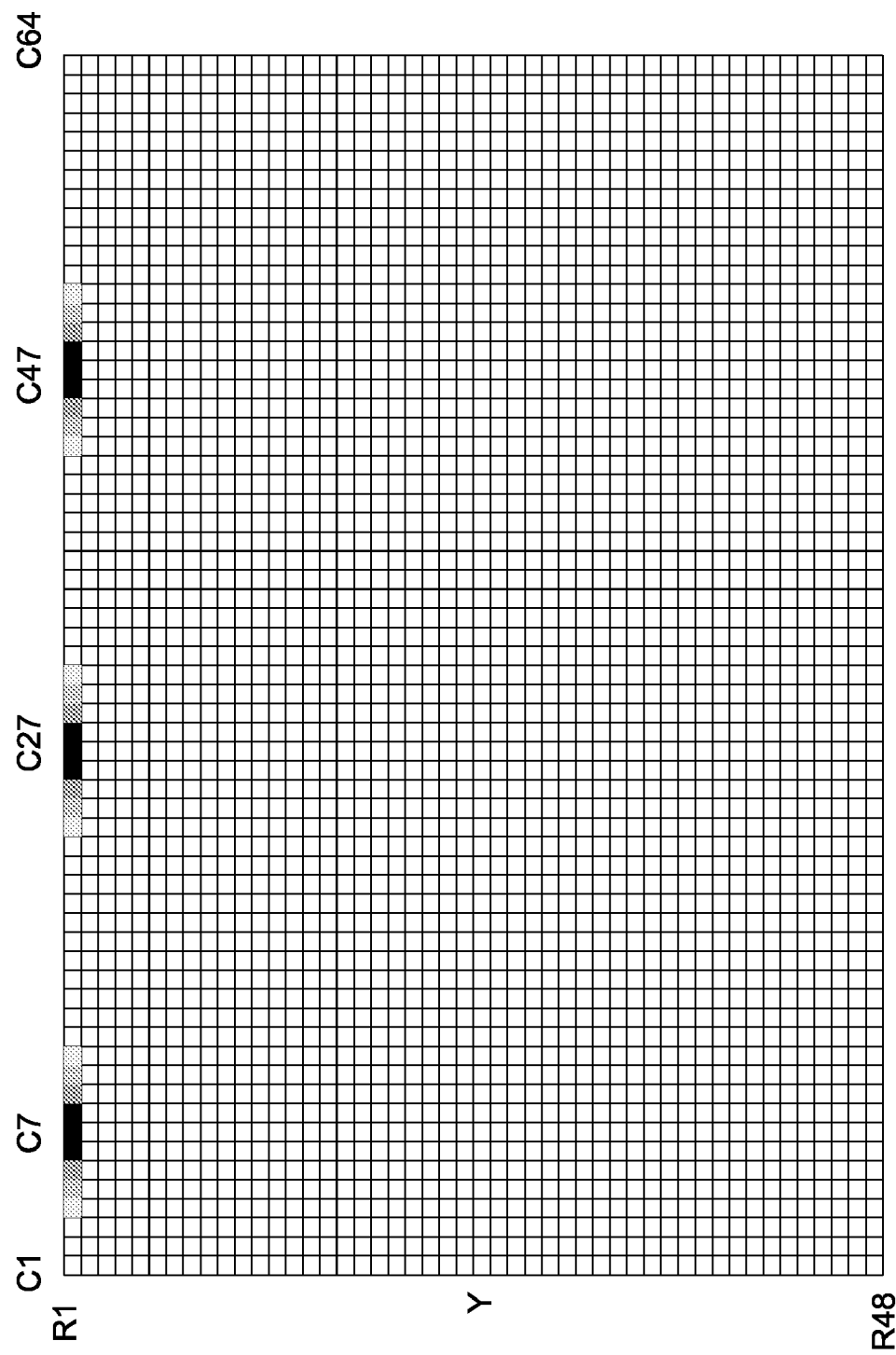
FIG. 5 illustrates one row of a pixilated image of a flat, white object positioned 50 mm from the detachable tip of FIG. 2, the image being captured during activation of a second light emitter, in one embodiment of the invention.

To further continue the image capturing sequence, a second emitter image 500 can be captured with the general viewing light source 228 deactivated, the first light emitter 211 deactivated, and the second light emitter 212 activated. FIG. 5 illustrates one row of the pixilated second emitter image 500 of a flat, white object 206 positioned 50 mm from the detachable tip 230 of FIG. 2, the second emitter image 500 being captured during activation of the second light emitter 212 and deactivation of the general viewing light source 228 and the first light emitter 211, using the detachable tip 230 of FIG. 2. Multiple second emitter images 500 can also be captured, and the values obtained from each second emitter image 500 can be averaged. Each pixel can have an associated luminance value (e.g., grey scale between 0 and 255). The center of each shadow in the projected shadow pattern 202 is captured in the image pixels C7, C27, and C47 of row R1. Each shadow tapers moving outward from each shadow's center, so the brightness value in each pixel increases moving to the left or to the right from the center of each shadow.

The general viewing light source 228 and/or the light emitters 211, 212 can be activated and/or deactivated in rapid succession and/or automatically after initiating the image capturing sequence to reduce movement of the detachable tip 230 between image capture and to increase the ability to capture images of the identical field of view. Additionally, if additional light emitters are used, additional images can be captured with each additional light emitter solely activated.

In one embodiment, the first light emitter 211 can be activated for the detachable tip 230 and the video inspection device 100 to capture the first light emitter image 400 and the second light emitter image 500, as the first light emitter 211 can be moved from one position to a second position to capture the separate emitter images 400, 500.

In another embodiment, the second light emitter 212 can project light without a shadow-forming element 289, 290, 291 projecting a shadow. In this case, the light emitter 212 can be positioned so the shadow-forming elements 289, 290, 291 are not in the path of light projected from the light emitter 212. Alternatively, the shadow-forming elements 289, 290, 291 can be moveable so that they can be moved out of the path of the light emitters 211, 212 when an image is desired to be captured from one of the light emitters 211, 212 with no projected shadow pattern 201, 202.

In another embodiment, only the first light emitter 211 and the general viewing light source 228 are activated for the detachable tip 230 and the video inspection device 100 to capture images.

Figure 6:
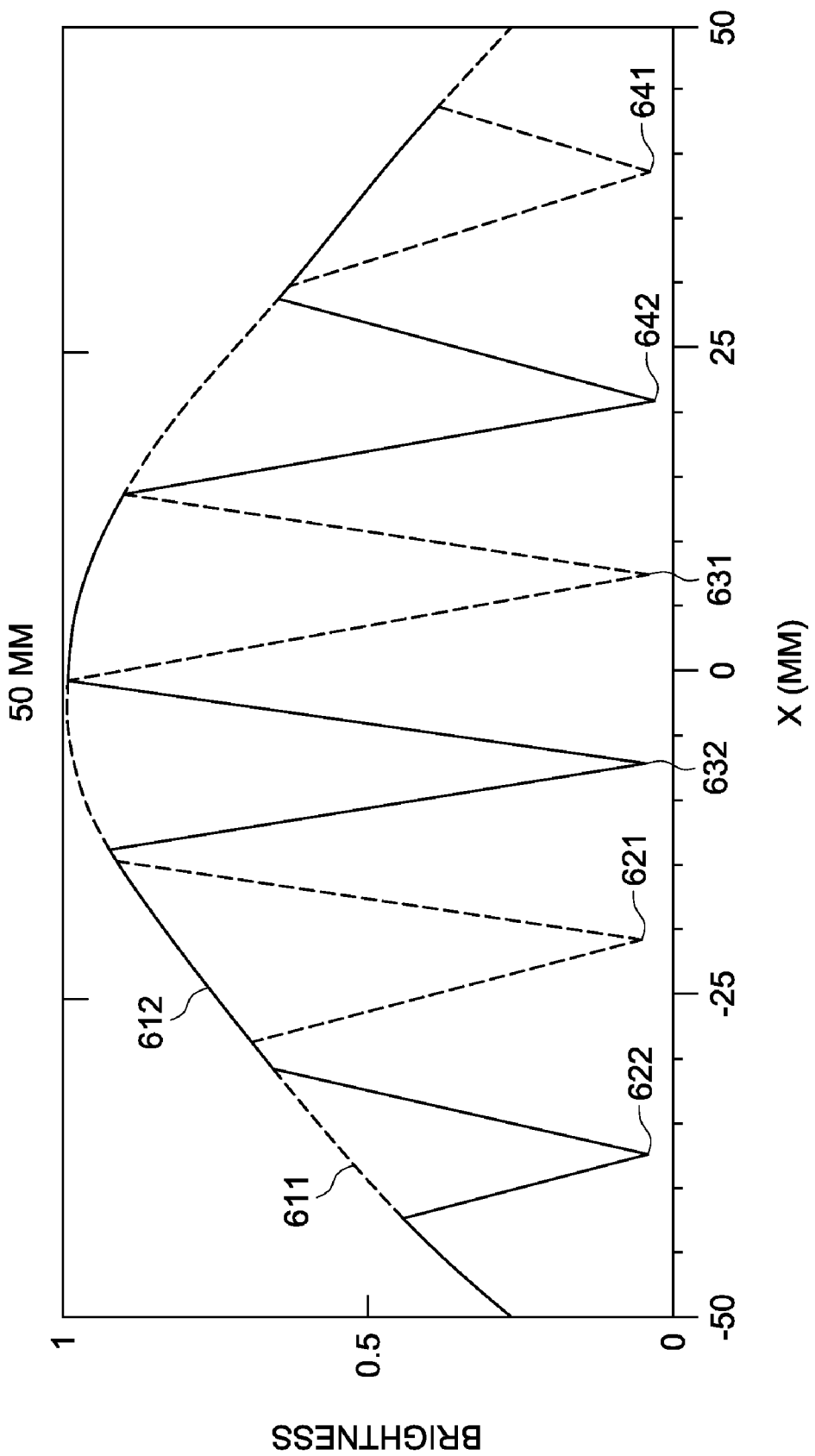
FIG. 6 illustrates a brightness profile of the image of FIG. 4 and a brightness profile of the image of FIG. 5, each across one row of pixels, in one embodiment of the invention.

FIG. 6 illustrates the brightness profile 611 of the first emitter image 400 of FIG. 4 and the brightness profile 612 of the second emitter image 500 of FIG. 5, both across one row of pixels representing the X dimensional distance in the field of view. The brightness is charted on a scale of 0 to 1, with 1 being the brightest. Brightness profile 611 represents the luminance values of row R1 of the first emitter image 400 captured during activation of the first light emitter 211. Brightness profile 612 represents the luminance values of row R1 of the second emitter image 500 captured during activation of the second light emitter 212. Hence, brightness profile valleys 621, 631, and 641, represent the shadowed areas for the first emitter image 400 captured during activation of the first light emitter 211, and brightness profile valleys 622, 632, and 642, represent the shadowed areas for the second emitter image 500 captured during activation of the second light emitter 212. The bases at the respective brightness profile valleys 621, 631, and 641 represent the darkest points while the first light emitter 211 is activated. The bases at the respective brightness profile valleys 622, 632, and 642 represent the darkest points while the second light emitter 212 is activated. At a 50 mm object distance from the detachable tip 230, the field of view is approximately 80 mm wide, from about −40 mm to about 40 mm. The bases of the brightness profile valleys 622, 632, and 642 are at about −38 mm, −8 mm, and 21 mm, respectively. The bases of the brightness profile valleys 621, 631, and 641 are at about −21 mm, 8 mm, and 38 mm, respectively.

The brightness of each projected shadow pattern 201, 202 can be calibrated for ambient light. To reduce or suppress effects of ambient light, an ambient light image can be captured with no light emitters 211, 212 activated and without the general viewing light source 228 activated so the ambient light brightness can be determined and subtracted.

Figure 7:
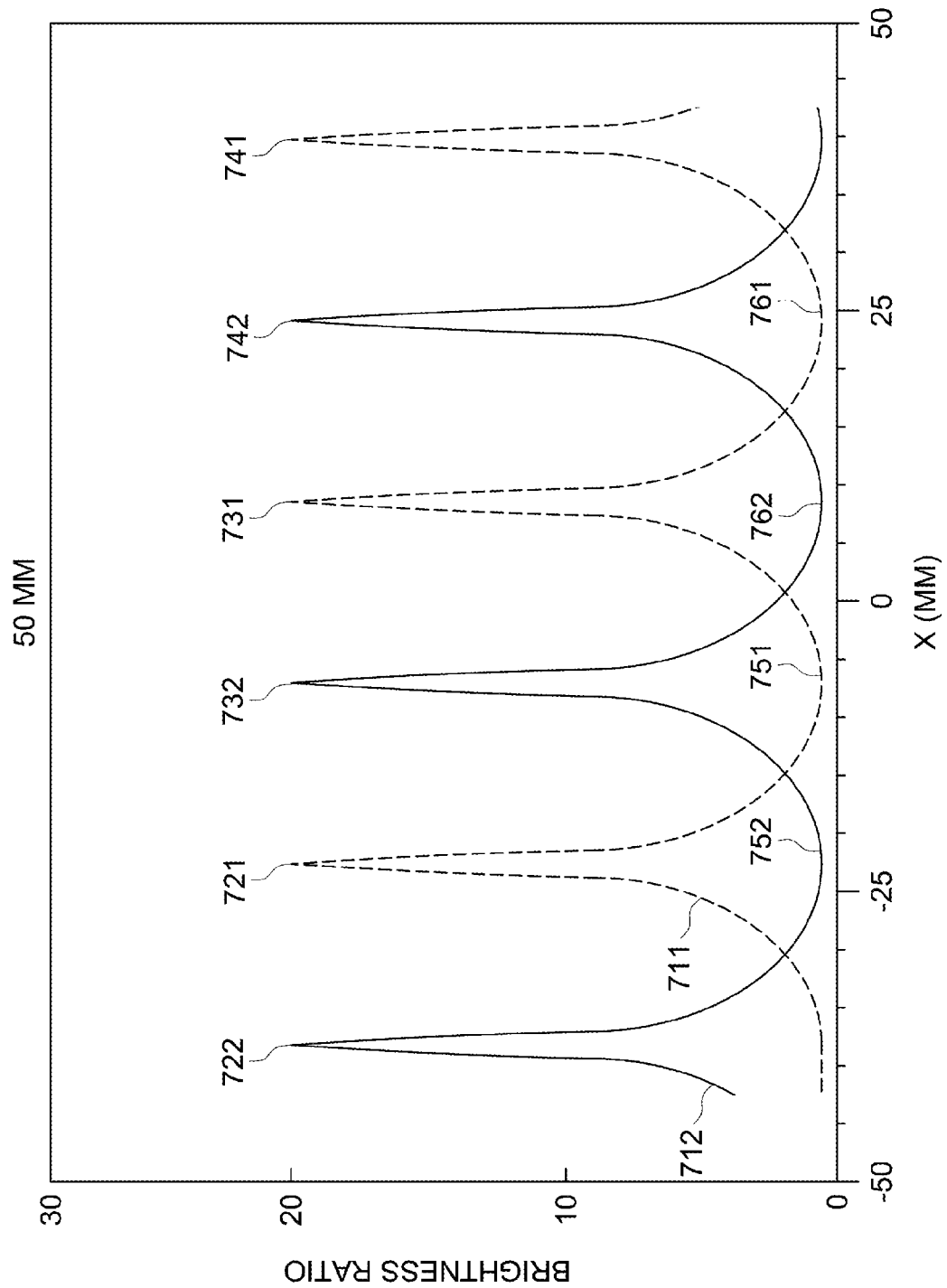
FIG. 7 illustrates brightness ratios of the brightness profiles illustrated in FIG. 6, in one embodiment of the invention.

FIG. 7 illustrates brightness ratio curves 711, 712 of the two projected shadow patterns 201, 202 for one row of pixels when the viewed object 206 is 50 mm from the detachable tip 230 in one embodiment of the invention depicted in FIG. 2. The brightness ratio curve 711 shows the ratios of the brightness values of the first emitter image 400 of FIG. 4 to the brightness values of the second emitter image 500 of FIG. 5, and the brightness ratio curve 712 shows the ratios of the brightness values of the second emitter image 500 of FIG. 5 to the brightness values of the first emitter image 400 of FIG. 4, each across one row of pixels. The brightness ratio curves 711, 712 can be determined in order to obtain more well-defined points in the shadows. Brightness ratios can be determined by dividing each of the brightness profiles 611, 612 across the whole width of the projected shadow patterns 201, 202 in the field of view by the other of the brightness profiles 611, 612. The brightness ratio curve 711, having a local maximum brightness ratio extreme at each brightness ratio peak 721, 731, and 741, can be obtained by dividing the luminance values obtained for each pixel in row R1 of the second emitter image 500 captured when the second light emitter 212 is activated by the luminance values obtained for each pixel in row R1 of the first emitter image 400 captured when the first light emitter 211 is activated. The second brightness ratio curve 712, having a local maximum brightness ratio extreme at each brightness ratio peak 722, 732, and 742, can be obtained by the reciprocal division. Each curve 711, 712 exhibits a sharp brightness ratio peak at the center of each shadow, where each shadow is darkest. For instance, the brightness ratio peak 742 corresponds with the brightness profile valley 642 of FIG. 6 and line 232 of FIG. 2 at 50 mm. The brightness ratio peaks 721, 731, 741, 722, 732, 742 for the brightness ratio curves 711, 712 can be generally parabolic, whereas the brightness profile valleys 621, 631, 641, 622, 632, 642 for the brightness profiles 611, 612 can be generally linear.

When only the first emitter image 400 is captured with a shadow pattern 201, then the same division, using the brightness values of the image 400 and the brightness values of either a general viewing image 300 or a second emitter image 500 with no shadow pattern 201, 202 projected, can be calculated to obtain brightness ratio values. Sharp peaks 721, 731, 741 can still occur because the brightness values in the image with no shadow pattern 201, 202 can be high, and the high values divided by the low values at the bases of the brightness profile valleys 621, 631, 641 can yield high results.

In the illustrative example, the v-shaped brightness profile valleys 621, 631, 641, 622, 632, 642 of FIG. 6 are easily identifiable. However, for a non-flat, non-smooth, and/or non-regular surface, light is typically reflected unevenly due to surface contours and variations in light absorption resulting in large variations in image brightness. Surface features, such as lines or cracks, that create dark lines in the image may be difficult to distinguish from the shadows or may change the apparent positions of the shadow valleys. The shadows can also be deformed by the surface contours. In these cases, the v-shaped brightness profile valleys 621, 631, 641, 622, 632, 642 of FIG. 6 might be difficult to identify directly. Each parabolic curve of FIG. 7, obtained by determining the brightness ratios, provides a more well-defined point which can be more easily and particularly identifiable. The sharper brightness ratio peaks 721, 731, 741, 722, 732, and 742 can be more easily discernible as a matter of their sharpness.

The object distance can also be determined using local minimum brightness ratio extremes. For example, the brightness ratio valleys 751, 761, which are local minimum brightness ratio extremes between the brightness ratio peaks 721, 731, 741, can be discerned and used to determine the object distance. The brightness ratio valleys 751, 761 can correlate with a respective one of the brightness ratio peaks 732, 742. For example, the brightness ratio valleys 751, 761 can be obtained by the reciprocal division used to determine the brightness ratio peaks 732, 742. Likewise, each brightness ratio valley 752, 762 (e.g. local minimum ratio extreme between each brightness ratio peak 722, 732, 742), which can correlate with a respective one of the brightness ratio peaks 721, 731, can also be discernible and used to determine the object distance. These brightness ratio valleys 751, 761, 752, 762 can be more easily identifiable when the brightness ratio valleys 751, 761, 752, 762 and/or the brightness ratio peaks 721, 731, 741, 722, 732, 742 are more densely grouped, which creates a sharper, narrower curve through the valleys 751, 761, 752, 762.

In determining the brightness ratio, variations in the reflectivity of the viewed surface, as described above, affect the resulting brightness ratios 711, 712 diminutively because the shadow patterns 201, 202 are equally affected. For example, if one point on the viewed surface reflects 20% of the incident light, then 20% of the light in the shadow pattern 201 having an incident intensity I201 is reflected, yielding a reflected intensity of 0.2*I201. 20% of the light in the shadow pattern 202 having an incident intensity I202 is also reflected, yielding a reflected intensity of 0.2*I202. The ratio of these reflected intensities is 0.2*I201/(0.2*I202) or I201/I202. Thus, the reflectance of the surface does not materially affect the brightness ratio.

Though most areas inspected using the video inspection device 100 have little ambient light, some ambient light may be present in certain applications. Ambient light may reduce the darkness of the projected shadows if the intensity of the ambient light is significant relative to the intensity of the projected patterns in the shadow areas. In such situations, the values of the brightness ratio peaks 721, 731, 741, 722, 732, and 742 are reduced which, depending on the level of reduction, may reduce the reliability and/or accuracy detecting the brightness ratio peak locations. To counteract this effect, in one embodiment, one or more ambient images are captured with the light emitters 211, 212 and the general viewing light source 228 disabled or deactivated. The pixel brightness values of the ambient images are then subtracted from the pixel brightness values of the emitter images 400, 500 before determining the brightness ratios. Unless the ambient lighting changes significantly between the time when the images 400, 500 are captured, the effects of the ambient light are greatly reduced resulting in larger brightness ratio peaks. In one embodiment, all of the brightness ratio peaks below a certain threshold peak value (e.g., 5) can be filtered out to remove any peaks that may be caused by incident light and/or darkness.

Figure 8:
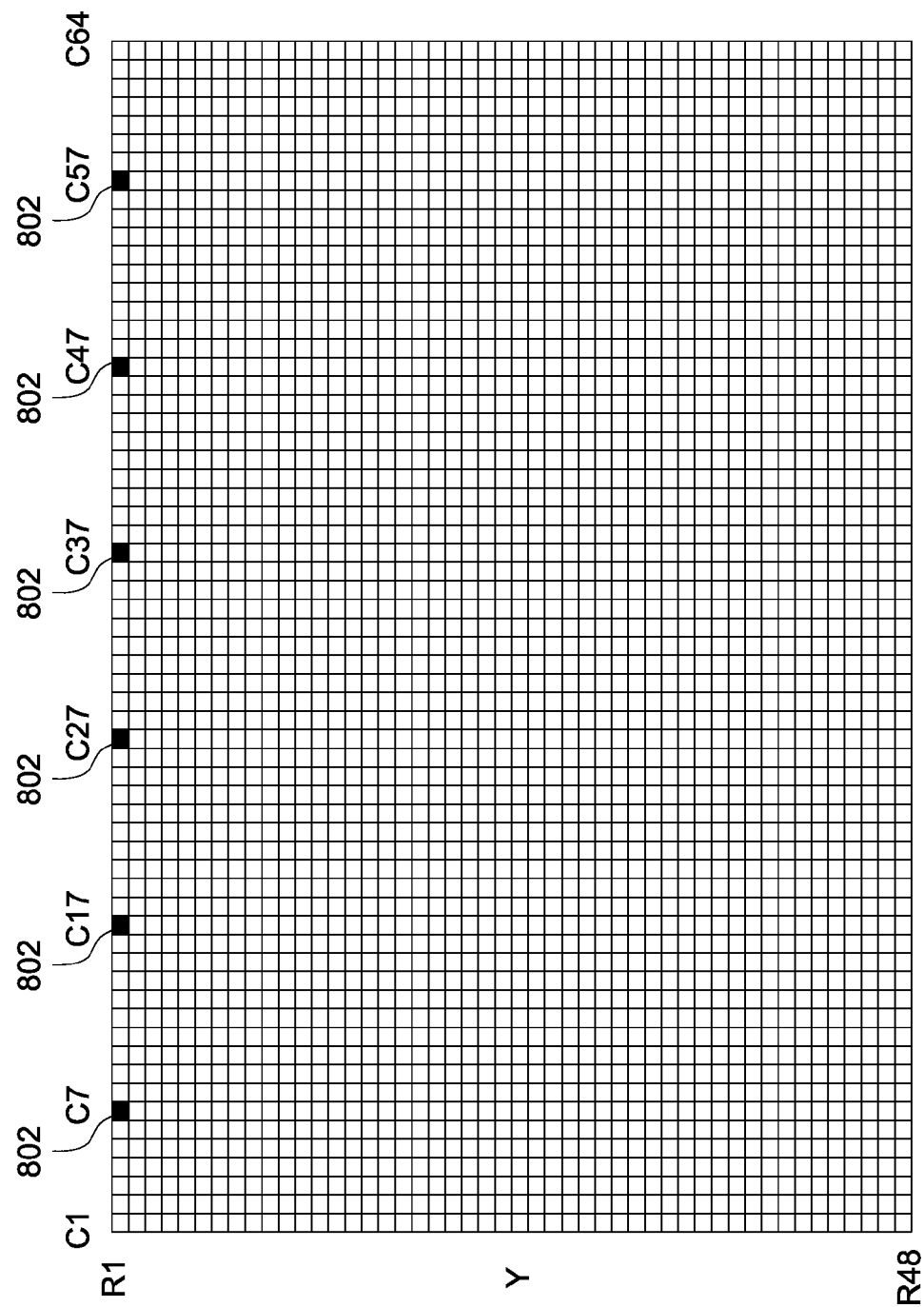
FIG. 8 is a schematic diagram depicting the identification of brightness ratio peak pixels, each containing a brightness ratio peak as illustrated in FIG. 7, in one embodiment of the invention.

Each local brightness ratio extreme pixel (e.g. each pixel containing a brightness ratio peak or a brightness ratio valley) can be identified. FIG. 8 is a schematic diagram depicting the identification of brightness ratio peak pixels 802, corresponding to the brightness ratio peaks 721, 731, 741, 722, 732, 742 for a single row of pixels R1 according to one embodiment of the invention. Each pixel can be analyzed. Row R1 illustrates the brightness ratio peak pixels 802 at which the brightness ratio peaks 721, 731, 741, 722, 732, 742 occur as exemplified in FIG. 7. The brightness ratio peak pixels 802 containing the brightness ratio peaks 721, 731, 741, 722, 732, 742 are identified by solid boxes in Row R1 and Columns C7, C17, C27, C37, C47, and C57. In the exemplary embodiment, because the surface is smooth and flat, the solid boxes shown will continue to extend in straight columns through the remaining rows, assuming the shadow-forming elements 289, 290, 291 are long enough to project a shadow in the Y dimension over the entire field of view represented. These columns represent the projected shadow patterns 201, 202 in the X-Y plane.

A non-flat and/or non-smooth surface adds an additional Z dimension that can be captured in this X-Y representation with lines that appear curved, broken, or otherwise non-straight. The X-Y plane can be considered a two dimensional plane collapsed from the three dimensional space occupied by the viewed object 206. The three dimensional space can be collapsed into the X-Y plane of pixels in the viewing direction of the lens 234. In this case, because the object 206 is flat, the X-Y plane truly is only a two dimensional plane. The shadows can be projected from the detachable tip 230 so that any Z dimensional variation of the object 206 can be captured along the paths of projected shadows as X dimensional variation of the shadows. The X dimensional variation of the shadows can be indicated by a shift of the brightness ratio peak to the left or to the right from the solid brightness ratio peak pixels 802 shown in FIG. 8.

Therefore, the shadow positions in the X-Y plane can be used to determine the Z-dimensional object distance at the shadow positions. The object distance, in the Z-dimension, of each shadow from the detachable tip 230 can be predicted based on the position of the brightness ratio peak value in the X-Y plane of pixels, based on the known geometry of the light emitters 211, 212, shadow-forming elements 289, 290, 291, and/or the other tip viewing optics, such as the lens 234 (e.g., using triangulation from the known positions and angles of the elements). For instance, using the known geometries of the tip viewing optics, if it is known that the brightness ratio peak pixel 802 at row R1, column C7 will contain a brightness ratio peak value associated with the shadow trajectory 222 when the viewed object 206 at the actual location represented by the pixel row R1, column C7 is 50 mm from the detachable tip 230, then if projected shadow patterns 201, 202 produce images with brightness ratios having a brightness ratio peak value at the pixel located at row R1, column C7, and that peak is determined to be associated with the shadow trajectory 222, it can be determined that the location on the object 206 represented by row R1, column C7 is at an object distance of 50 mm from the detachable tip 230.

The emitter images 400, 500 captured with each light emitter 211, 212 can correlate with the general viewing image 300 captured using the general viewing light source 228. Therefore, the Z dimensional object distance determined for specific pixels in the emitter images 400, 500 captured using the light emitters 211, 212 can also be correlated to the corresponding pixels in the general viewing image 300 captured during activation of the general viewing light source 228.

Continuing with the example of FIG. 8, since the object distance of the location on the object 206 represented by brightness ratio peak pixel 802 at row R1, column C7 and the shadow trajectory 222 is known to be 50 mm, that same pixel at row R1, column C7 on the general viewing image 300 will have an object distance of 50 mm. An operator can determine the object distance from the detachable tip 230 to the viewed object 206, or the spatial characteristics of the viewed object 206, at particular locations on the object 206 using the general viewing image 300 of the object 206.

The structured-light projecting optics can be configured to produce brightness ratio peaks that are densely grouped. This dense grouping helps obtain more data points to achieve a better representation of the object 206. The object distance at object locations where there are gaps between brightness ratio peaks can be estimated based on pixel data of pixels neighboring pixels with a brightness ratio peak, and/or the spatial characteristics of areas with little or no data can be estimated based on the obtained data, or interpolated from the obtained data. For instance, once the X, Y, and Z coordinates, or row, column, Z coordinates are known for each brightness ratio peak location or each brightness ratio peak pixel 802, curve fitting can be used to determine a function $Z=f(X,Y)$ or $Z=f(row,column)$. The straightness of the shadow peak lines in columns C7, C17, C27, C37, C47, and C57, combined with the regular spacing between the lines in columns C7, C17, C27, C37, C47, and C57 reveal a uniform object distance at each of the locations correlated with the brightness ratio peak pixels 802 in columns C7, C17, C27, C37, C47, and C57. This uniformity at these locations indicates a flat, smooth surface. If a uniform ridge were revealed along the entire length of space represented by column C17, for instance, then it might be assumed that the ridge uniformly subsided to the obtained object distances at columns C7 and C27.

Figure 9:
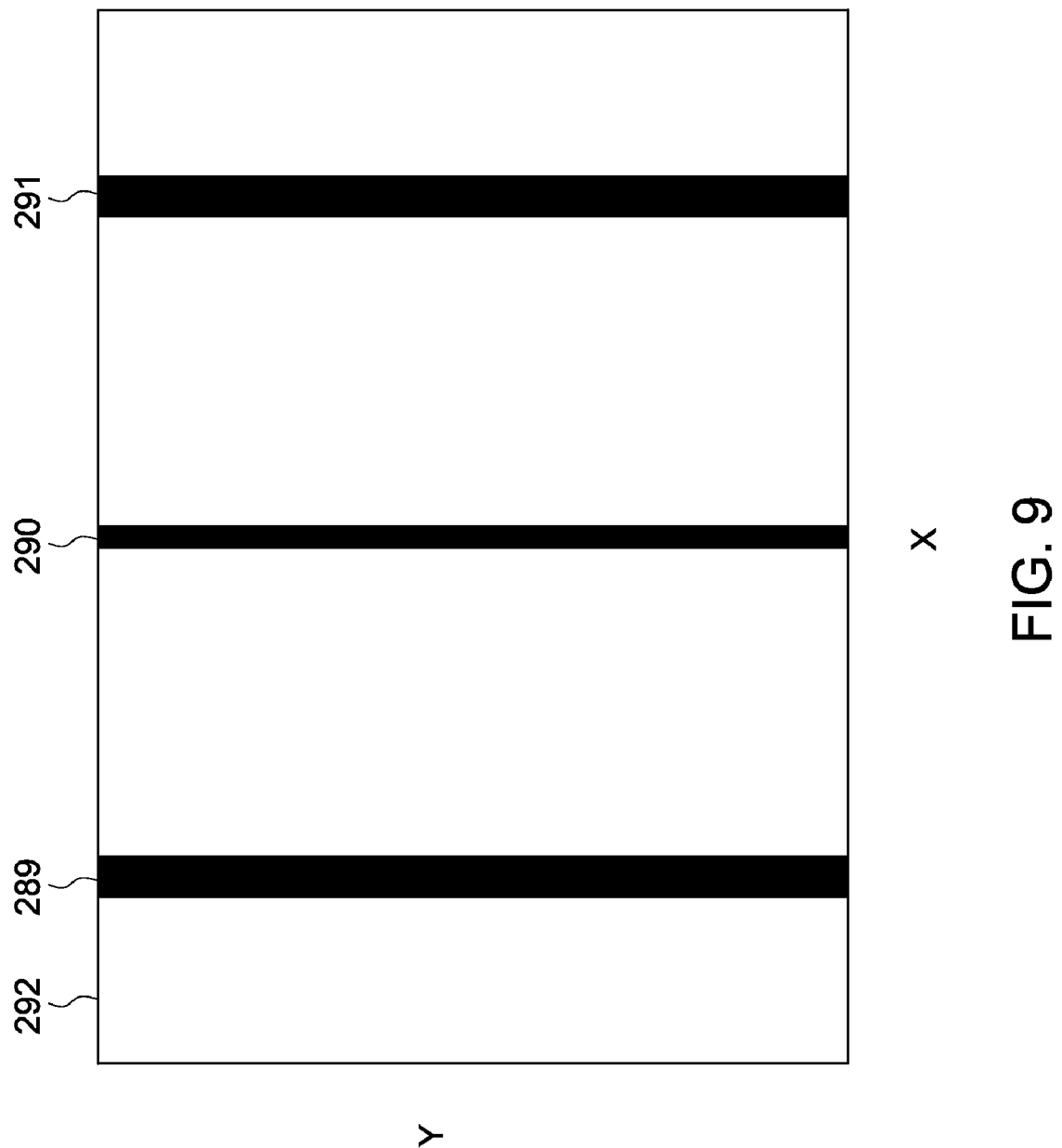
FIG. 9 illustrates shadow-forming elements in one embodiment of the invention wherein a center shadow-forming element is narrower than two peripheral shadow-forming elements.

As the distance of the object 206 in the Z dimension changes, different shadows can appear at a particular pixel. Discerning between shadow areas can be important in identifying which shadow area is used in determining the object distance. In one embodiment, identifying a shadow area can be accomplished by projecting one shadow area different from the others. For instance, rather than the shadow-forming elements 289, 290, 291 all being the same width, as depicted in FIG. 2, one shadow-forming element 289, 290, 291 can be wider or narrower than the others, thereby projecting one shadow different from the others. In FIG. 9, for instance, the center shadow-forming element 290 is narrower than the two peripheral shadow-forming elements 289, 291. All the shadow-forming elements 289, 290, 291 are positioned in the opening 292.

Figure 10:
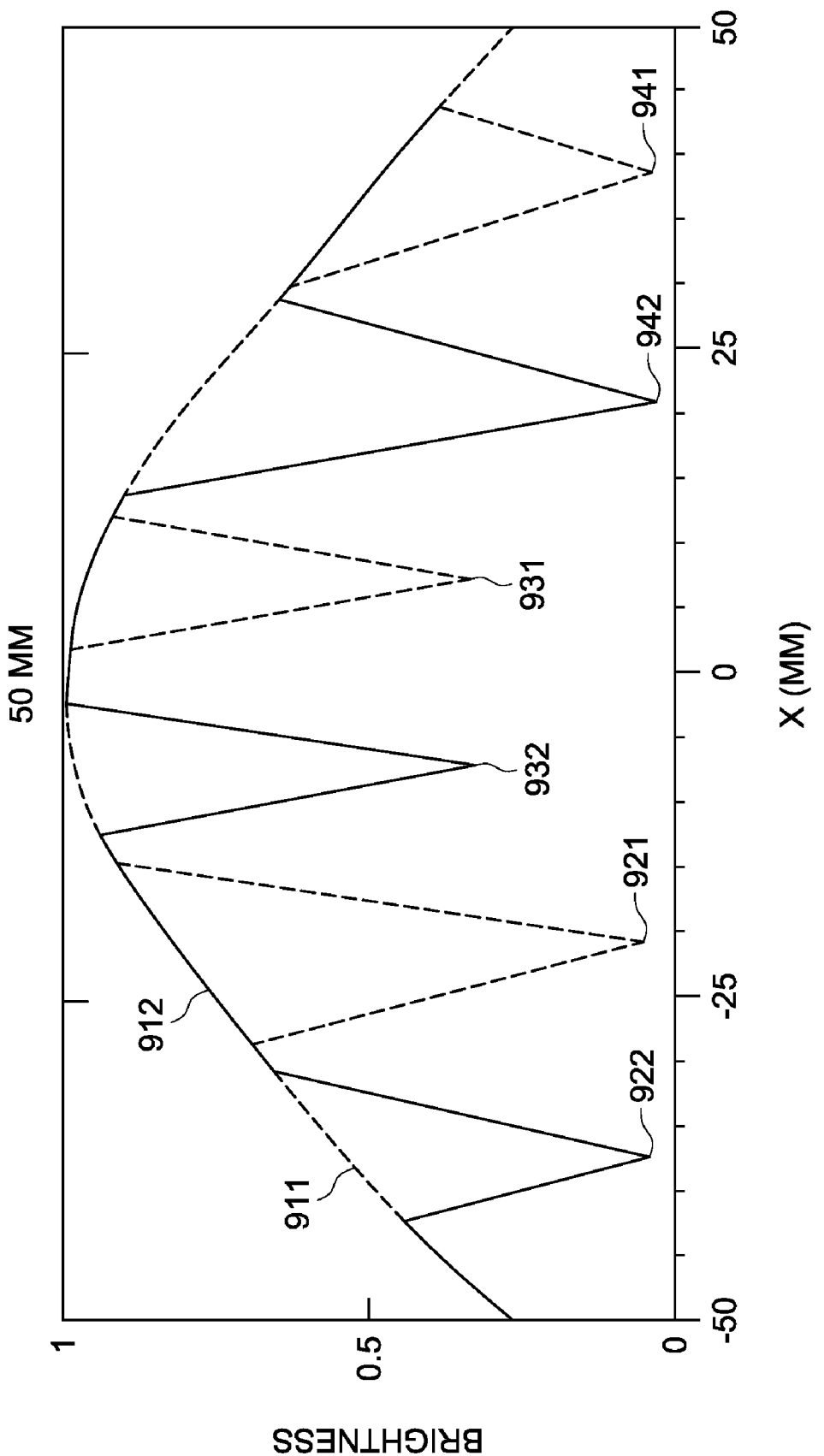
FIG. 10 illustrates a brightness profile of one row of pixels of each image captured of a flat, white object 50 mm from a detachable tip, one image captured during activation of a first light emitter and one image captured during activation of a second light emitter, in one embodiment of the invention using two light emitters and three shadow-forming elements, wherein the center shadow-forming element is narrower than the peripheral shadow-forming elements.

FIG. 10 illustrates brightness profiles 911, 912 of one row of pixels for the images captured of a flat, white object 206 50 mm from a detachable tip 230, one image captured during activation of the first light emitter 211 and one image captured during activation of the second light emitter 212, in one embodiment of the invention using two light emitters 211, 212 and three shadow-forming elements 289, 290, 291, wherein the center shadow-forming element 290 is narrower than the peripheral shadow-forming elements 289, 291. FIG. 10 is identical to FIG. 6 at 50 mm, except for the effects of the narrower center shadow-forming element 290 represented in FIG. 10. The two resulting center shadows, one produced and imaged during the activation of the first light emitter 211 and the other produced and imaged during the activation of the second light emitter 212, can be narrower and not as dark at the center as the other shadows. Brightness profile valleys 931 and 932 represent this distinguishing quality. The brightness profile valleys 931 and 932 are not as deep or as wide as the brightness profile valleys 921, 922, 941, and 942, representing that the shadows associated with the brightness profile valleys 931 and 932 are less dark (e.g. have more luminance) and are narrower. This distinguishing shadow quality can be more emphasized in the corresponding brightness ratio depicted in FIG. 11.

Figure 11:
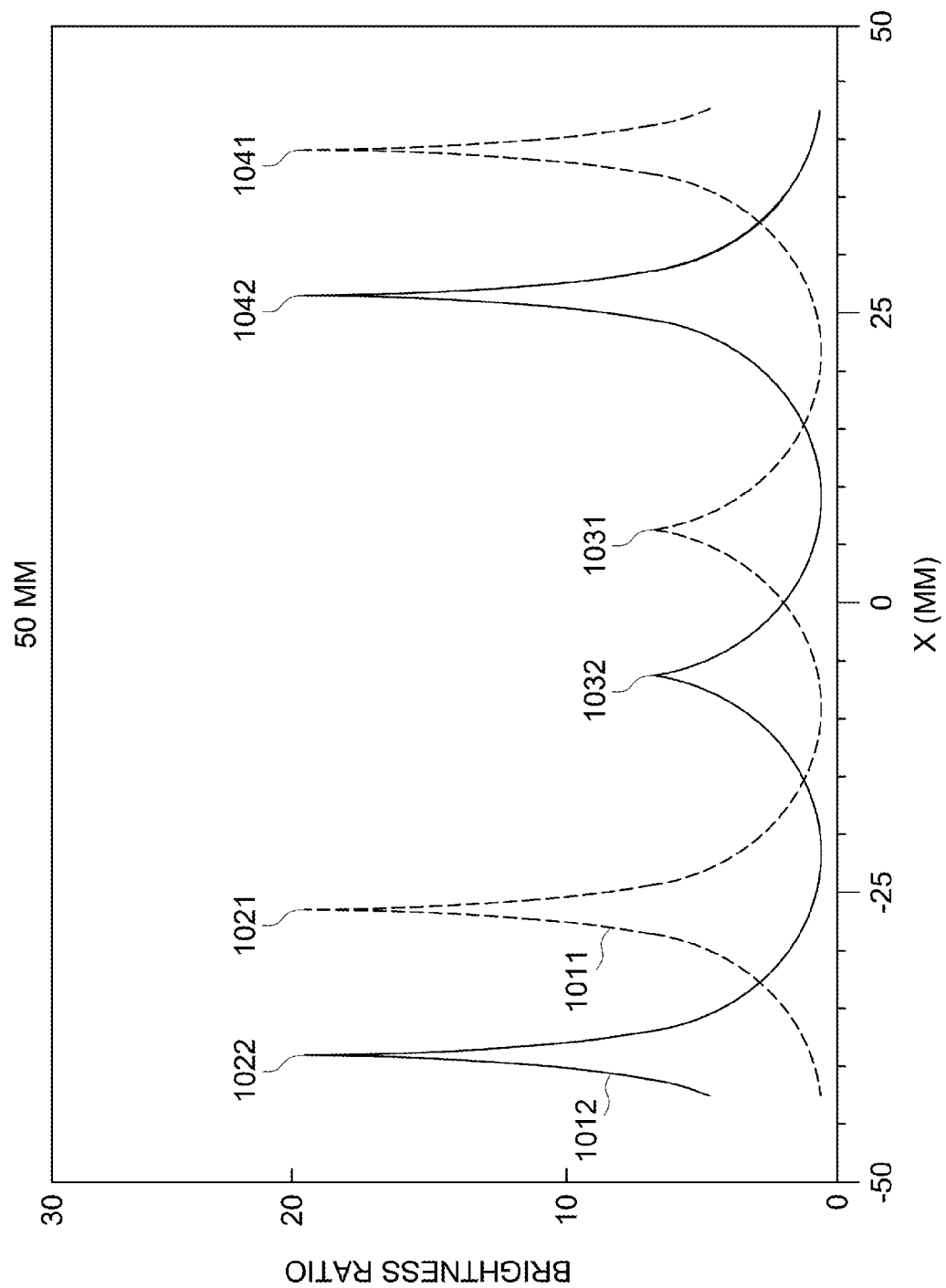
FIG. 11 illustrates brightness ratios of the brightness profiles illustrated in FIG. 10 in one embodiment of the invention.

FIG. 11 illustrates brightness ratio curves 1011, 1012, which are ratios of the brightness profiles 911, 912 illustrated in FIG. 10. The two brightness ratio peaks 1031, 1032, which respectively correspond to the brightness values of the brightness profiles 911, 912 at the brightness profile valleys 931, 932 are significantly shorter than the other brightness ratio peaks 1021, 1022, 1041, 1042 and can thus be used to determine which shadow trajectory is associated with each brightness ratio peak. The identifiable brightness ratio peaks can be used to determine the object distance from the detachable tip 230 to the viewed object 206.

Other methods to distinguish between shadow areas can be utilized as well. For instance, in one embodiment, the image brightness, camera gain, camera exposure, and light emitter drive parameters can be used to estimate object distance based on an assumed surface reflectivity. This estimated object distance can then be further used with the known projection geometries to determine which shadow area is used in the geometry to determine the correct distance from the detachable tip 230 to surface positions on the viewed object 206.

In another embodiment, another projected shadow pattern can be projected from a different position on the detachable tip 230. The relative positions of the projected shadow patterns 201, 202 can be used to distinguish brightness ratio peak lines, such as those depicted in FIG. 8.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of structured light-based measurement for determining the distance from a probe of a video inspection device to an object, wherein the video inspection device has a first light emitter and a second light emitter for emitting light through an opening with at least one shadow-forming element onto the object forming a plurality of shadows on the object when the light emitters are activated, the method comprising the steps of:
   capturing at least one first emitter image of the object with the first light emitter activated, and the second light emitter deactivated, wherein the first emitter image has a first shadow formed by the at least one shadow-forming element;
   capturing at least one second emitter image of the object with the second light emitter activated, and the first light emitter deactivated, wherein the second emitter image has a second shadow formed by the at least one shadow-forming element;
   determining a first plurality of luminance values of the pixels in the at least one first emitter image;
   determining a second plurality of luminance values of the pixels in the at least one second emitter image;
   determining the brightness ratios of the first plurality of luminance values of the pixels in the at least one first emitter image to the second plurality of luminance values of the pixels in the at least one second emitter image; and
   determining an object distance using the brightness ratios.

2. The method of claim 1 wherein the step of determining the object distance using the brightness ratios further comprises identifying at least one brightness ratio extreme pixel in the at least one first emitter image where at least one brightness ratio extreme corresponding to the first shadow occurs and utilizing the coordinates of the at least one brightness ratio extreme pixel to determine the object distance.

3. The method of claim 2 wherein the at least one brightness ratio extreme is a brightness ratio peak and the at least one brightness ratio extreme pixel is a brightness ratio peak pixel.

4. The method of claim 3, wherein the step of identifying the at least one brightness ratio peak pixel in the at least one first emitter image where at least one brightness ratio peak corresponding to the first shadow occurs comprises the steps of:
   determining a threshold peak value; and
   removing any brightness ratio peaks with a brightness ratio below the threshold peak value.

5. The method of claim 2 wherein the at least one brightness ratio extreme is a brightness ratio valley and the at least one brightness ratio extreme pixel is a brightness ratio valley pixel.

6. The method of claim 2, further comprising the steps of:
   determining the brightness ratios of the second plurality of luminance values of the pixels in the at least one second emitter image to the first plurality of luminance values of the pixels in the at least one first emitter image;
   identifying the brightness ratio extreme pixels in the at least one second emitter image where the brightness ratio extremes corresponding to the second shadow occur; and
   identifying and determining the object distance for at least one of the brightness ratio extreme pixels.

7. The method of claim 2 wherein the step of determining the object distance further comprises determining multiple object distances using the brightness ratio extreme pixels and utilizing the multiple object distances to estimate an object distance at a non brightness ratio extreme pixel location.

8. The method of claim 7 wherein the step of utilizing comprises performing a curve fit using the multiple object distances.

9. The method of claim 1, further comprising capturing at least one general viewing image of the object with a general viewing light source activated and with the first light emitter and second light emitter deactivated, wherein the general viewing image does not have any of the plurality of shadows formed by the at least one shadow-forming element and wherein the general viewing image is displayed while a measurement is performed utilizing the object distance.

10. The method of claim 9, wherein the step of determining the object distance for the pixels in the at least one general viewing image corresponding to the brightness ratio extreme pixels in the at least one first emitter image is based on the known geometry of at least the first light emitter and the shadow forming element.

11. The method of claim 9, further comprising the step of determining an object distance for pixels of the first emitter image by interpolating between the object distances of nearby pixels in the at least one general viewing image corresponding to the brightness ratio extreme pixels in the at least one first emitter image.

12. The method of claim 1, wherein the step of determining a first plurality of luminance values of the pixels in the at least one first emitter image is performed based on an average of a plurality of first emitter images.

13. The method of claim 1, wherein the step of determining a second plurality of luminance values of the pixels in the at least one second emitter image is performed based on an average of a plurality of second emitter images.

14. The method of claim 1, wherein the first plurality of luminance values of the pixels in the at least one first emitter image comprises luminance values for a row of pixels in the at least one first emitter image.

15. The method of claim 1, further comprising the steps of:
capturing at least one ambient image of the object with the first light emitter deactivated, and the second light emitter deactivated;
determining a third plurality of luminance values of the pixels in the at least one ambient image;
subtracting the third plurality of luminance of values of the pixels in the at least one ambient image from the first plurality of luminance values of the pixels in the at least one first emitter image; and
subtracting the third plurality of luminance of values of the pixels in the at least one ambient image from the second plurality of luminance values of the pixels in the at least one second emitter image.

16. A method of structured light-based measurement for determining the distance from a probe of a video inspection device to an object, wherein the video inspection device has a first light emitter and a second light emitter, wherein the first light emitter can emit light through an opening with at least one shadow-forming element onto the object forming at least one shadow on the object when the first light emitter is activated, the method comprising the steps of:
capturing at least one first emitter image of the object with the first light emitter activated and the second light emitter deactivated, wherein the first emitter image has a first shadow formed by the at least one shadow-forming element;
capturing at least one second emitter image of the object with the second light emitter activated and the first light emitter deactivated;
determining a first plurality of luminance values of the pixels in the at least one first emitter image;
determining a second plurality of luminance values of the pixels in the at least one second emitter image;
determining the brightness ratios of the second plurality of luminance values of the pixels in the at least one second emitter image to the first plurality of luminance values of the pixels in the at least one first emitter image; and
determining an object distance using the brightness ratios.

17. The method of claim 16 wherein the second light emitter emits light through the opening with the at least one shadow forming element.

18. The method of claim 16 wherein the first light emitter and the second light emitter are a single light emitter, and the shadow-forming element is switchable between a shadow forming position to capture the at least one first emitter image and a non shadow-forming position to capture the at least one second emitter image.

19. The method of claim 16, wherein the first light emitter and the second light emitter are a single light emitter switchable between a shadow forming condition to capture the at least one first emitter image and a non shadow-forming position to capture the at least one second emitter image.

20. The method of claim 16 wherein the shadow-forming element comprises multiple areas that can be switched between transparent and opaque and wherein a plurality of images are captured, each image of the plurality of images captured with at least one different opaque area selected.

* * * * *